(12) United States Patent
Oeser et al.

(10) Patent No.: US 12,263,939 B2
(45) Date of Patent: Apr. 1, 2025

(54) APPARATUS FOR ATTACHING AERODYNAMICALLY FUNCTIONAL FILMS AND USE THEREOF

(71) Applicant: Lufthansa Technik AG, Hamburg (DE)

(72) Inventors: Oliver Oeser, Borstel-Hohenraden (DE); Dirk Trottnow, Sahms (DE); Andreas Flanschger, Graz (AT); Kai-Christoph Pfingsten, Hamburg (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 15 days.

(21) Appl. No.: 17/779,583

(22) PCT Filed: Nov. 27, 2020

(86) PCT No.: PCT/EP2020/083563
§ 371 (c)(1),
(2) Date: May 25, 2022

(87) PCT Pub. No.: WO2021/105315
PCT Pub. Date: Jun. 3, 2021

(65) Prior Publication Data
US 2023/0010729 A1    Jan. 12, 2023

(30) Foreign Application Priority Data
Nov. 28, 2019 (DE) ...................... 10 2019 132 344.4

(51) Int. Cl.
*B64C 21/10* (2006.01)
*B64F 5/10* (2017.01)
*F15D 1/00* (2006.01)

(52) U.S. Cl.
CPC ................ *B64C 21/10* (2013.01); *B64F 5/10* (2017.01); *F15D 1/0035* (2013.01); *F15D 1/0085* (2013.01); *B64C 2230/26* (2013.01)

(58) Field of Classification Search
CPC ....... F15D 1/12; B64C 21/10; B29D 99/0025; B29C 65/7802; B29C 31/085;
(Continued)

(56) References Cited

U.S. PATENT DOCUMENTS 5,246,519 A * 9/1993 McCormick ............ G09F 3/203
156/289
2007/0031639 A1   2/2007 Hsu et al.
(Continued)

FOREIGN PATENT DOCUMENTS

DE    102013102164 A1    9/2014
DE    102017205912 A1 * 10/2018 ............... B32B 3/00
(Continued)

OTHER PUBLICATIONS

ORAFOL, "Processing Guidelines ORAFOL Films for Aerospace Application", https://www.orafol.com/products/europe/de/application-instructions/VH14-aircraft-eu-application-de.pdf, Feb. 15, 2021, p. 1-11, ORAFOL Europe GmbH, Oranienburg, Germany.

*Primary Examiner* — Philip J Bonzell
*Assistant Examiner* — Anna L. Gordon
(74) *Attorney, Agent, or Firm* — LEYDIG, VOIT & MAYER, LTD.

(57) ABSTRACT

An apparatus is for attaching an aerodynamically functional film to a surface of a body around which flow passes. The apparatus includes: a self-adhesive, redetachable positioning film having positioning aids for the exact positioning of the positioning film on the surface of the body around which flow passes and having at least one application area for the aerodynamically functional film that is to be applied.

13 Claims, 3 Drawing Sheets

(58) Field of Classification Search
CPC ..... B29C 37/0085; B29C 66/304; B32B 7/00; B32B 2405/00; B32B 2605/18; G09F 3/00; B44C 1/162–205
See application file for complete search history.

(56) References Cited

U.S. PATENT DOCUMENTS

| | | |
|---|---|---|
| 2009/0065645 A1 | 3/2009 | Cini |
| 2010/0187361 A1 | 7/2010 | Rawlings et al. |
| 2010/0316853 A1 | 12/2010 | Kuhlenschmidt |
| 2014/0255632 A1* | 9/2014 | Gradert .................. B29C 63/38 156/85 |
| 2015/0283757 A1* | 10/2015 | Koerwien ............... B29C 65/70 264/261 |
| 2019/0128296 A1* | 5/2019 | Watson ................... F01D 5/147 |
| 2019/0193841 A1 | 6/2019 | Ruppert et al. |
| 2019/0202547 A1 | 7/2019 | Wu et al. |
| 2020/0231272 A1* | 7/2020 | Crivella ................. B64C 21/00 |
| 2022/0033068 A1* | 2/2022 | Mikami ................... F15D 1/12 |

FOREIGN PATENT DOCUMENTS

| | | |
|---|---|---|
| EP | 3354563 A1 | 8/2018 |
| KR | 20190109997 A * | 9/2019 |
| WO | WO 2013005113 A2 | 1/2013 |

\* cited by examiner

APPARATUS FOR ATTACHING AERODYNAMICALLY FUNCTIONAL FILMS AND USE THEREOF

CROSS REFERENCE TO RELATED APPLICATIONS

This application is a U.S. National Phase application under 35 U.S.C. § 371 of International Application No. PCT/EP2020/083563, filed on Nov. 27, 2020, and claims benefit to German Patent Application No. DE 10 2019 132 344.4, filed on Nov. 28, 2019. The International Application was published in German on Jun. 3, 2021 as WO 2021/105315 A1 under PCT Article 21(2).

FIELD

The present disclosure relates to an apparatus for attaching aerodynamically functional films to surfaces of bodies around which flow passes, and to the use of such an apparatus.

BACKGROUND

Aerodynamically functional films can be used in different embodiments and fields of application, and generally serve to reduce the wall shear stress on surfaces of bodies around which flow passes. The aerodynamically functional films generally have a micro-structured surface for this purpose.

A common microstructure is what is referred to as the riblet structure, having very small ribs running substantially in the main flow direction. For instance, riblet structures are located for example on outer faces of aircraft, but also on rotor blades of wind turbines, on the shell plating of ships or on outer surfaces of high-speed trains. Such structures are likewise used for example on inner faces of pipelines.

In order for aerodynamically functional films and in particular riblet structures to be able to reduce the wall shear stress to the greatest possible extent, it is necessary that the film is aligned as precisely as possible in relation to the local main flow direction—that is to say that direction in which flow over the surface in the region of the film is predominantly expected to pass. In an aircraft, the main flow direction—which may well vary locally over the entire outer wall of an aircraft—over the outer wall is the result for example of flow passing around the aircraft in cruising flight.

Aerodynamically functional films in the form of generally rectangular or square patches in standard formats are adhesively bonded directly to a body around which flow passes. In this respect, they have to be positioned manually on the body and, if appropriate, processed further by being cut to size. In order to achieve positioning which is as precise as possible, a complex and in particular protracted initial measurement is necessary. In vehicles such as aircraft or high-speed trains, this means an undesirably long immobilization time for the attachment of aerodynamically functional films.

SUMMARY

In an embodiment, the present disclosure provides an apparatus that is for attaching an aerodynamically functional film to a surface of a body around which flow passes. The apparatus includes: a self-adhesive, redetachable positioning film having positioning aids for the exact positioning of the positioning film on the surface of the body around which flow passes and having at least one application area for the aerodynamically functional film that is to be applied.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
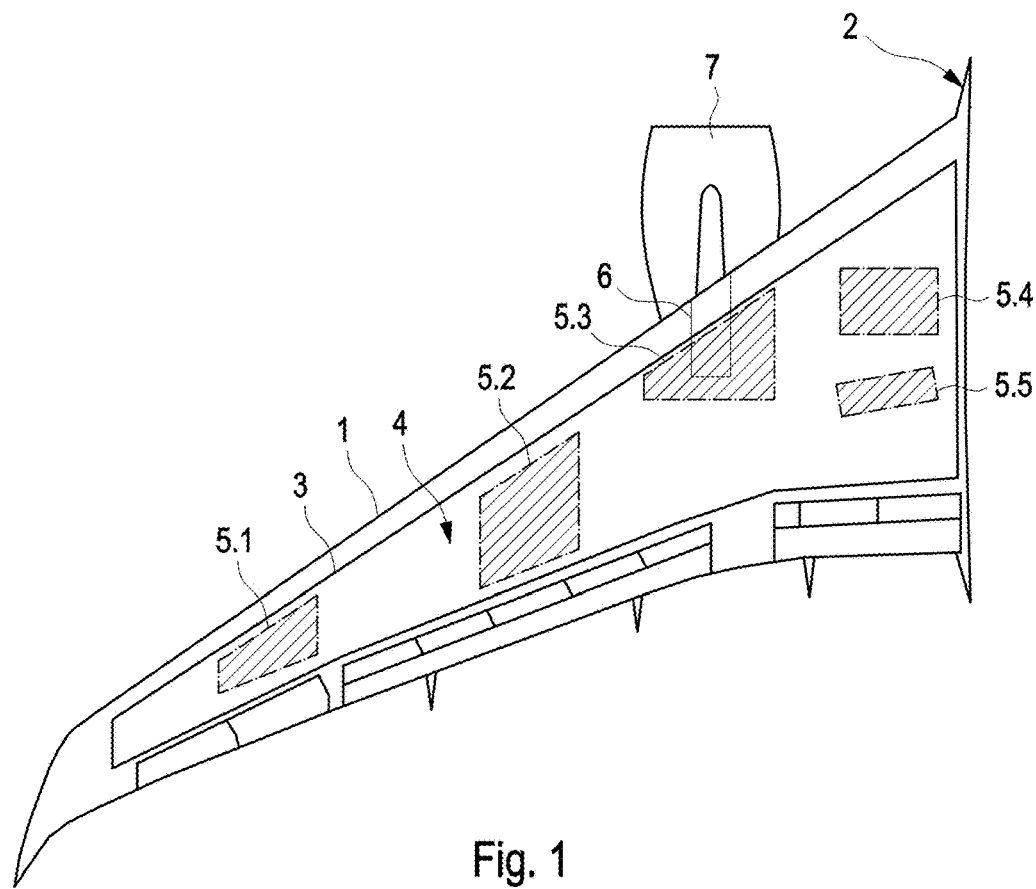
FIG. 1 shows a schematic plan view of an aircraft wing, which is to be provided with an aerodynamically functional film in specific regions.

Aspects of the present disclosure improve the attachment of aerodynamically functional films to surfaces of bodies around which flow passes such that the disadvantages known in the prior art no longer occur or occur only to a reduced extent.

Accordingly, an aspect of the present disclosure relates to an apparatus for attaching aerodynamically functional films to surfaces of bodies around which flow passes, comprising a self-adhesive, redetachable positioning film having positioning aids for the exact positioning of the positioning film on the surface of the body around which flow passes and having at least one application area for the aerodynamically functional film that is to be applied.

An aspect of the present disclosure also relates to the use of a positioning aid for the attachment of aerodynamically functional films to surfaces of bodies around which flow passes, having the following steps:

a) applying the positioning film of the apparatus, in the position predefined by the positioning aids, to the surface of the body around which flow passes;

b) applying the aerodynamically functional film to the surface of the body around which flow passes in the application areas of the positioning film; and c) removing the positioning film.

Within the meaning of the present disclosure, a film is "self-adhesive" if its location and position are fundamentally fixed after application to a surface. It is not ruled out here that a self-adhesive film can also be detached again, preferably nondestructively, from the surface as required. A self-adhesive film may be for example self-sticking for the purpose of producing a statically adhesive connection with the surface or may be magnetic. The film may be self-adhesively connected to the surface over all of its surface area or selectively.

The present inventors have recognised that the use of an apparatus in the form of a positioning film can considerably simplify and accelerate the attachment of aerodynamically functional films to surfaces in the correct position and alignment, without the accuracy of the positioning of the aerodynamically functional film(s) being reduced in the process. The positioning film is configured as a redetachable, self-adhesive film, for example sticky film, which, for the positioning of the aerodynamically functional film(s) on the surface of a body, is attached temporarily to the same surface, but is also removed again after the aerodynamically functional film(s) has been applied.

In this respect, the positioning film has positioning aids, which allow exact positioning of the positioning film on the surface of the body around which flow passes. The positioning aids may be edges of the positioning film, which are brought into contact or at least in line with projections or the like on the surface of the body around which flow passes. As an alternative or in addition, it is also possible to provide markings on the positioning film, which are intended to be brought in line with specific predefined features, such as screws, bores or joints, for example, on the surface of the body around which flow passes. If the positioning film is applied to the surface of the body around which flow passes in accordance with the positioning aids, correct positioning of the positioning film is ensured.

The correct positioning of the positioning film also ensures that the at least one application area of the positioning film is positioned correctly on the surface of the body around which flow passes. In this respect, the application area is that area in which the aerodynamically functional films are to be applied or are applied to the surface of the body around which flow passes.

In a first configuration of the present disclosure, at least one self-adhesive, aerodynamically functional film, which adheres to the surface of the body around which flow passes when the positioning film is being attached and remains on the surface of the body around which flow passes when the positioning film is subsequently removed, is provided in the region of the at least one application area on the self-adhesive side, provided for example with adhesive, of the positioning film. In other words, in the initial state the aerodynamically functional film and the positioning film form a multilayer unit, which is such that the aerodynamically functional film is adhesively bonded directly to the surface when the positioning film is applied in the correct position ensured with the aid of the positioning aids. The position of the aerodynamically functional film on the surface can be determined directly by the location of the film on the positioning film in this respect. It is of course also possible to provide more than one application area and/or aerodynamically functional film on the positioning film, in order to provide multiple regions of the surface of the body around which flow passes with an aerodynamically functional film.

If the positioning film together with the aerodynamically functional film(s) in the application area(s) is applied to the surface of the body around which flow passes, there is a respective adhesive connection both between the positioning film and the surface—specifically apart from the application areas—and between the aerodynamically functional film(s) and the surface—in the region of the application areas—, wherein in particular that adhesive connection which is between the positioning film and the surface is redetachable. By contrast, the connection between the aerodynamically functional film(s) and the surface is generally not configured for easy detachment. If the materially bonded connection between the aerodynamically functional film(s) and the surface of the body around which flow passes is not redetachable or has at least considerably higher adhesion, the positioning film can be pulled off of the surface, wherein in that case the aerodynamically functional film(s) remains in the desired position on the surface of the body around which flow passes.

It is preferred if, when it is necessary to align the aerodynamically functional film on the surface of the body around which flow passes—for example because it involves a riblet film to be aligned in the main flow direction —, the aerodynamically functional film is arranged on the positioning film in such a way that the aerodynamically functional film has the desired alignment after attachment of the aerodynamically functional film and subsequent removal of the positioning film.

In the or at least one of the aerodynamically functional films, openings and/or slots in the form of cutouts may be provided for locations to be kept free on the surfaces of the body around which flow passes. If the aerodynamically functional film is arranged for example in the region of a flap on the surface of the body around which flow passes, the functionality of the flap can still be ensured by virtue of suitable slots in the aerodynamically functional film. Other apertures or sensors on the surface of the body around which flow passes can also be kept free by virtue of suitable openings in the aerodynamically functional film.

In a second configuration of the present disclosure, an application window, within which at least one aerodynamically functional film can be applied to the surface of the body around which flow passes after attachment of the redetachable adhesive film, is provided in the region of at least one application area. An application window is an opening in the positioning film which, after the positioning film has been attached to the surface of a body around which flow passes, specifies the position of the aerodynamically functional film to be applied in a further step, and in which the aerodynamically functional film can be applied directly. If the aerodynamically functional film is applied fully within the application window(s), the positioning film can be removed again.

It is preferred for the positioning film to have, in the region of the application window, alignment aids for the alignment of the aerodynamically functional film to be applied. The alignment aids may be for example markings on the positioning film, which specify how the aerodynamically functional film to be applied is aligned, for example because it is a riblet film to be aligned in the local main flow direction.

As an alternative or in addition, the outline of the at least one application window may be matched to the shape of the aerodynamically functional film to be attached within at least one application window, wherein the outline of the at least one application window is preferably unsymmetrical. In other words, the outline of the application window thus preferably corresponds to the outline of the film to be applied, such that said film can be applied through the application window to the surface of the body around which flow passes only in a few possible alignments, as a result of which the risk of misalignment of the aerodynamically functional film can be reduced. This can fundamentally also apply whenever multiple film portions are applied through the application window in order to jointly form the desired area with aerodynamic action on the surface of the body around which flow passes, to the extent that the film portions forming the outline of the area can each be positioned only in a few positions within an application window.

The risk of misalignment of the aerodynamically functional film can almost completely be ruled out if the outline of the application window and therefore preferably also the outline of the film to be applied through this application window has an unsymmetrical configuration. In this case, the film can be applied generally only in a single alignment through the application window. This also fundamentally again applies whenever multiple film portions are applied through the application window in order to jointly form the desired area with aerodynamic action on the surface of the body around which flow passes.

It is also possible to use a second positioning film designed in accordance with the first configuration of the present disclosure instead of an aerodynamically functional film with an outline matched directly to the edge of the application window. The positioning aids of the second positioning film, on which the final aerodynamically functional film is arranged, can then be matched to the edge of the application window of the (first) positioning film.

In addition or as an alternative, the positioning film according to an aspect of the present disclosure may also be used to position what are referred to as cutting tapes—also referred to as knifeless tapes.

Corresponding cutting tapes are generally applied to the surface of the body around which flow passes before the aerodynamically functional film. After the aerodynamically functional film has been applied, the cutting tape is pulled off, with the result that the aerodynamically functional film is cut to size along the cutting tape. The so-called cutting tapes thus make it possible to easily match aerodynamically functional films to interrupted surfaces, for example through access openings on a aircraft fuselage.

For the exact positioning of cutting tapes, they can be applied to the surface of the body around which flow passes using a positioning film according to an aspect of the present disclosure.

In this case, at least one cutting tape is preferably applied to the surface of the body around which flow passes at the edge of the application area. After the positioning film has been pulled off, the cutting tape remains on the surface of the body around which flow passes. The aerodynamically functional film can then be applied. Subsequently, by pulling off the cutting tape the aerodynamically functional film is cut where it overlaps the cutting tape.

Reference is made to the above embodiments for an explanation of the use according to aspects of the present disclosure.

FIG. 1 schematically illustrates a plan view of the wing 1 of a passenger aircraft 2 in the form of a body around which flow passes. Provided on the wing 1 is a marking 3, which characterizes that area 4 of the wing 1 which may be accessed. In precisely this tread area 4, regions 5.1-5.5 are provided which are to be provided with an aerodynamically functional film, specifically a riblet film. In the region 5.3, there extends a flap 6 which, when opened, allows access to the suspension of the engine 7. The function of the flap 6 must not be adversely affected by the aerodynamically functional film to be attached in the region 5.3 in question.

Figure 2:
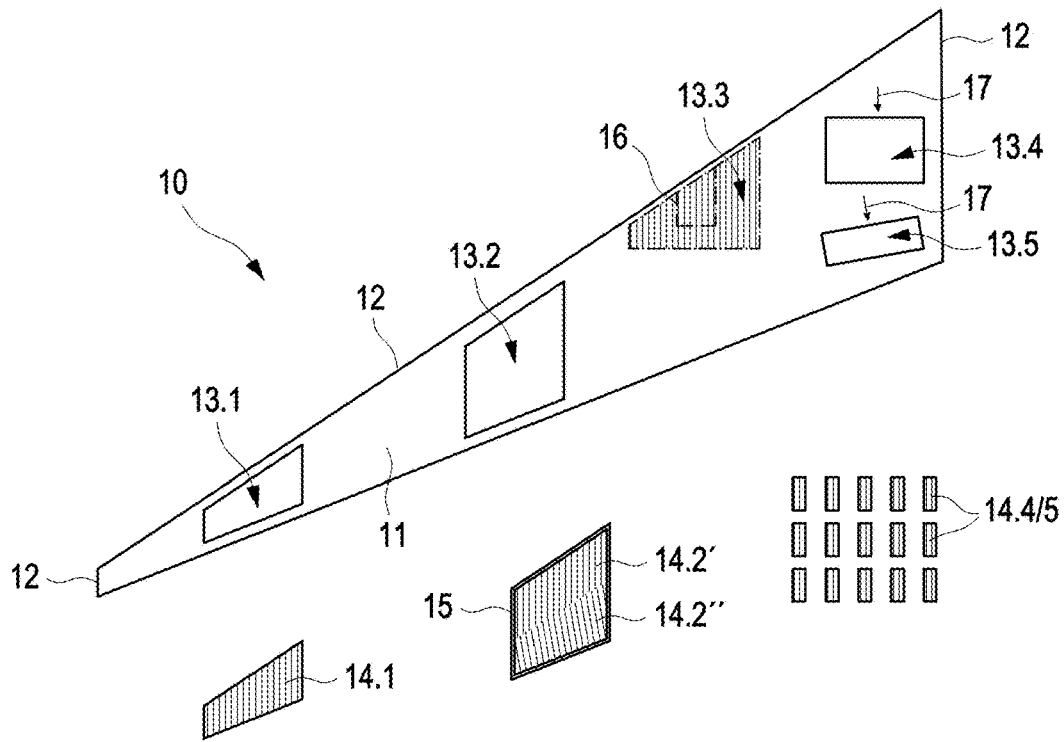
FIG. 2 shows a kit comprising an apparatus for attaching the aerodynamically functional film to the aircraft wing according to FIG. 1.

FIG. 2 illustrates a kit 10, by means of which the aerodynamically functional film can be attached quickly and positionally accurately in the desired regions 5.1-5.5 on the wing 2.

The kit 10 comprises a positioning film 11, the top side of which is illustrated and which is self-sticking on the bottom side in such a way that the positioning film 11 can also be detached again, without residue, from a surface to which it is attached. In the exemplary embodiment illustrated, the positioning film 11 is self-sticking but can fundamentally also be statically or magnetically self-adhesive. The following embodiments regarding the self-sticking property of the positioning film 11 then apply analogously.

As positioning aids 12, the positioning film 11 has three edges which, in the use state, can be brought into line with the marking 3 of the tread surface 4 of the wing type for which the positioning film 11 illustrated is intended and as it is illustrated in FIG. 1, as a result of which the correct alignment of the positioning film 11 is ensured.

In addition, the positioning film 11 also has a number of application areas 13.1-13.5 that corresponds to the regions 5.1-5.5 of the wing 1 that are to be provided with aerodynamically functional film. The shapes of the application areas 13.1-13.5 are matched in each case to the regions 5.1-5.5, with which they coincide when the positioning film 11 is properly attached to the wing 1.

The application area 13.1 is in the form of an application window, i.e. an opening in the positioning film 11, which has an unsymmetrical outline. For the application area 13.1, an aerodynamically functional film 14.1 is provided, which can be applied to the wing 1 only in a predefined position within the application window. Thus, the application window also directly predefines the alignment of the aerodynamically functional film 14.1 on the wing 1, which is why the film 14.1 has a riblet structure, corresponding to the main flow direction to be expected, in the region 5.1.

The application area 13.2 is also in the form of an application window, that is to say an opening in the positioning film 11. On account of the size of the application area 13.2, however, the main flow direction can no longer be considered to be constant over the area. In order to take account of this, two aerodynamically functional films 14.2', 14.2" are provided, which together completely cover the region 5.2, but have different alignments of their riblet structures. In order nevertheless to enable joint application of the two films 14.2', 14.2", a second positioning film 15 is provided, on the self-adhesive bottom side of which the two films 14.2', 14.2" are arranged in the correct alignment in relation to one another. The adhesive layer of the films 14.2', 14.2" is provided on the side facing away from the positioning film 15. The application of the two aerodynamically functional films 14.2', 14.2" using the second positioning film 15 will be explained in more detail below.

In the application area 13.3, the positioning film 11 is continuous and has no opening. For this, the aerodynamically functional film 14.3, the adhesive layer of which is arranged on the side facing away from the positioning film 11, is arranged directly on the bottom side of the positioning film 11. The aerodynamically functional film 14.3 has slots 16, which correspond to the border of the flap 6 on the wing 1, with the result that the flap 6 can still be opened even after the aerodynamically functional film 14.3 has been attached in the region 5.3. The attachment of the film 14.3 on the wing 1 will be described in more detail below.

The application areas 13.4 and 13.5 are rectangular application windows in the positioning film 11, which correspond to the respective regions 5.4 and 5.5. For the application areas 13.4 and 13.5, a multiplicity of smaller portions of aerodynamically functional film 14.4/5 in a standard size are provided, with which the regions 5.4 and 5.5 are to be furnished in the manner of tiles. In order to ensure that the portions of aerodynamically functional film 14.4/5 are applied to the wing 1 in the correct orientation in the regions 5.4 and 5.5, alignment aids 17, on the basis of which the aerodynamically functional film 14.4/5 to be applied can be aligned, are provided on the positioning film 11.

The use of the apparatus 10 according to FIG. 2 to attach an aerodynamically functional film 14.1-5 in the regions 5.1-5, provided for this purpose, on the wing 1 of the aircraft 2 according to FIG. 1 will now be explained with reference to FIGS. 3*a-c*.

Figure 3:
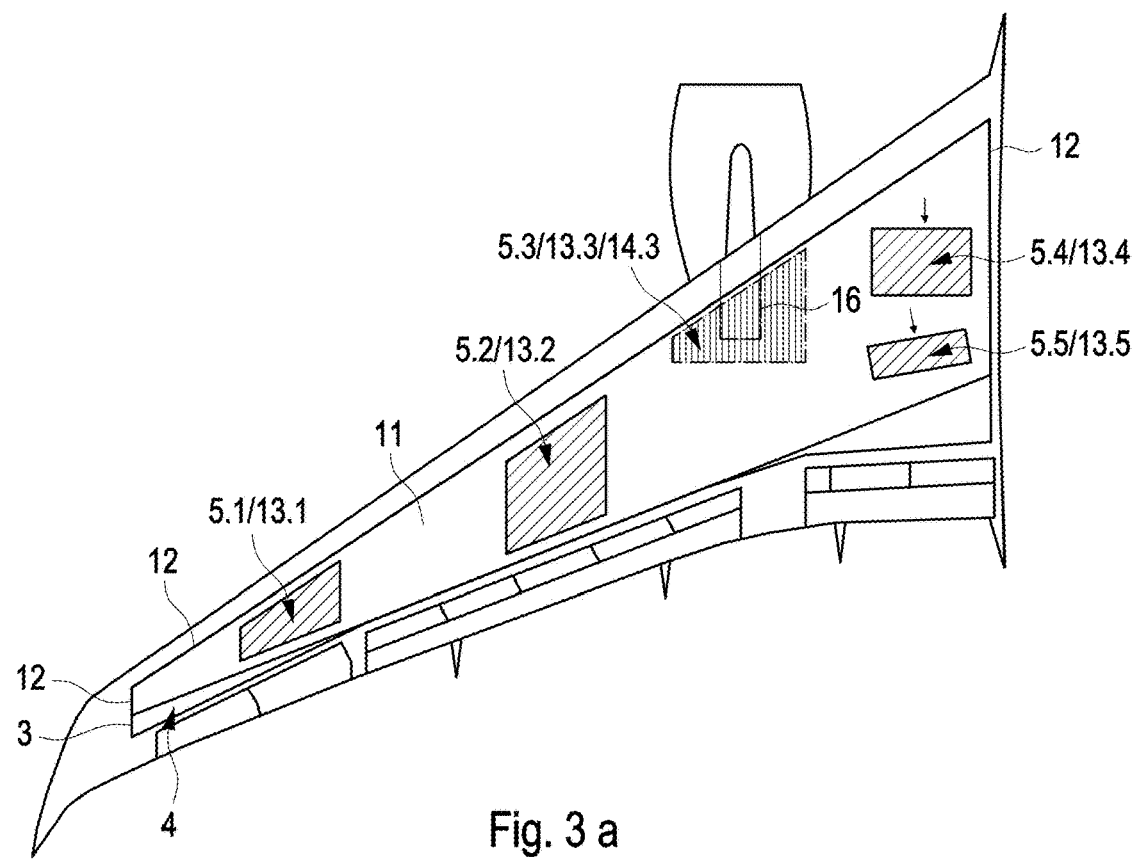
FIGS. 3a-c show schematic illustrations of the use of the kit according to FIG. 2 for attaching the aerodynamically functional film to the aircraft wing according to FIG. 1.
Figure 3:
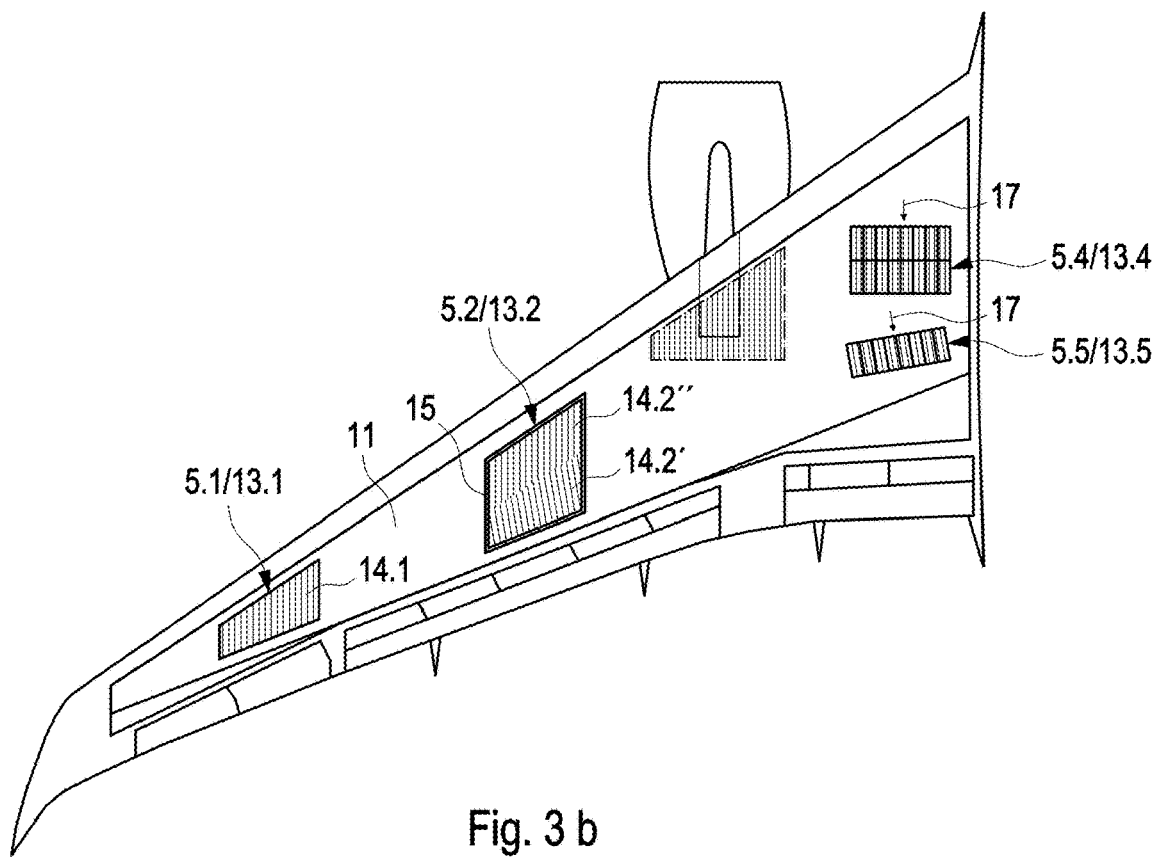
Figure 3:
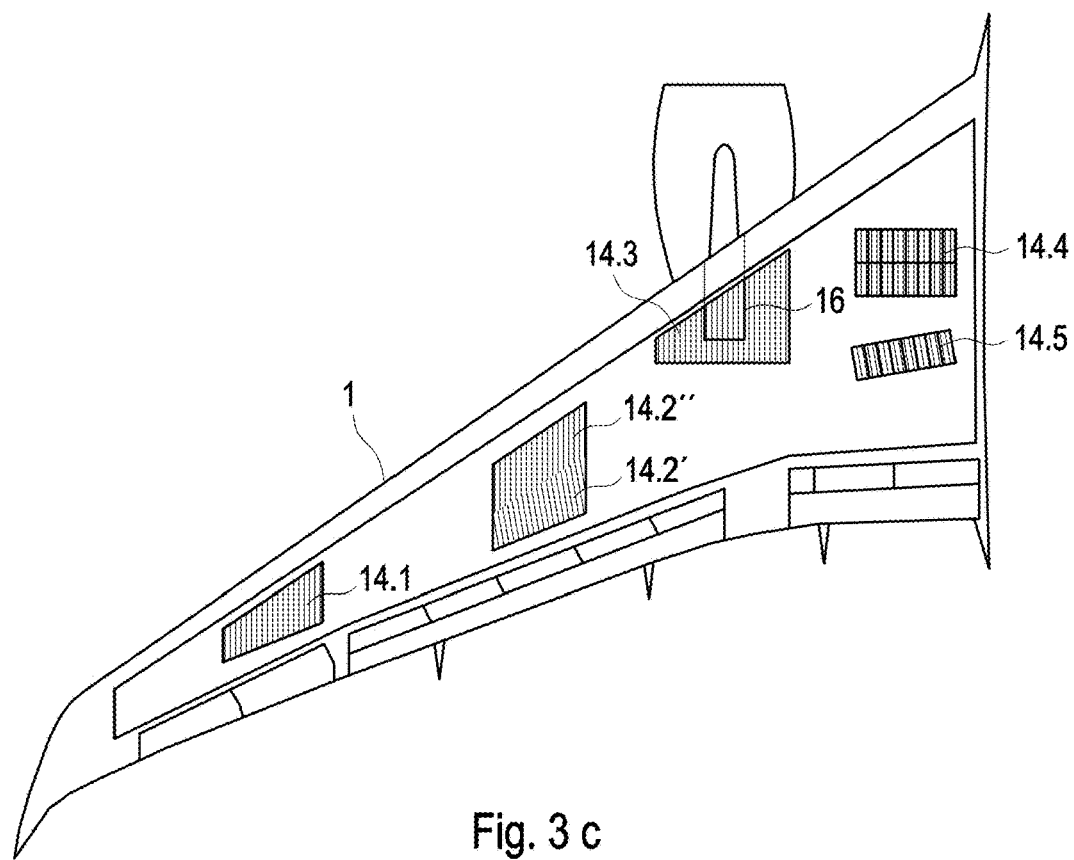

In a first step, illustrated in FIG. 3*a*, the positioning film 11 is adhesively bonded to the wing 1, care being taken that the edges 12, provided for this purpose, of the positioning film 11 correspond precisely to the marking 3 of the area 4 on the wing 1. If the positioning film 11 is applied correspondingly precisely to the wing 1, the application areas 13.1-5 correspond to the respective regions 5.1-5 provided for the attachment of aerodynamically functional films 14.1-5. In the region 5.3, when the positioning film 11 is being attached, the film 14.3 provided for this is even already applied or adhesively bonded to the wing 1 directly and in the correct position and orientation. In this case, the slot 16 in the film 14.3 corresponds to the edges of the flap 6.

In the rest of the regions 5.1, 5.2, 5.4 and 5.5, the respective films 14.1, 14.2, 14.4/5 are applied in the subsequent step (cf. FIG. 3*b*).

In the region 5.1, the film 14.1 is adhesively bonded within the application areas 13.1 in the sole orientation possible owing to the unsymmetrical preliminary cut. The same also applies for the films 14.2' and 14.2", which are fastened to the second positioning film 15. By applying the second positioning film 15 to the wing 1 in a position and orientation with respect to the application area 13.2 that are indicated by possible positioning aids, the correct positioning of the films 14.2' and 14.2" results directly.

In the regions 5.4 and 5.5, the individual film portions 14.4/5 are adhesively bonded one after the other, with the result that ultimately a continuous area of aerodynamically functional film 14 is produced, which fills out the entire regions 5.4 and 5.5. Care should be taken when attaching the film portions 14.4/5 that they are aligned in accordance with the alignment aids 17.

Lastly, the positioning films 11, 15 are removed, the aerodynamically functional films 14.1-5 remaining on the wing 1.

It is of course possible for the aerodynamically functional films 14.1-5 to still be reworked after the final adhesive bonding to the wing 1 and before or after the positioning films 11, 15 are removed, for example in order to ensure the functionality of further flaps or sensors.

Figure 4:
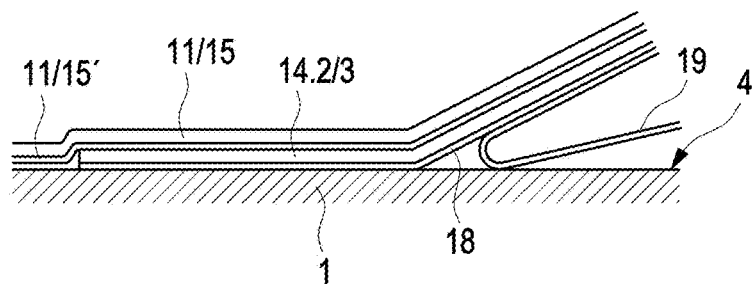
FIGS. 4a-b show schematic illustrations of a detail of a variant of the attachment of the aerodynamically functional film using the apparatus from FIG. 2.
Figure 4:
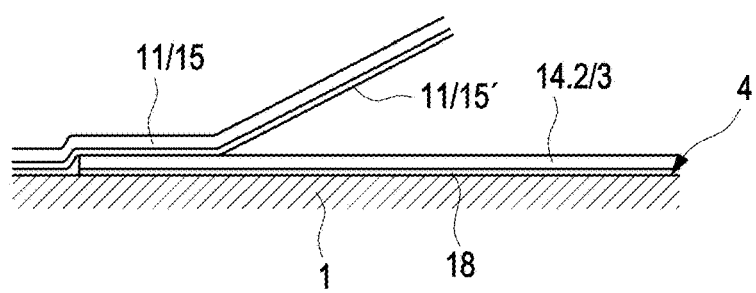

FIG. 4*a, b* illustrates the attachment and detachment of a positioning film 11, 15 with an aerodynamically functional film 14.2/3 arranged directly thereon.

As is illustrated in FIG. 4*a*, the positioning film 11/15 with its adhesive layer 11'/15', which is designed to be redetachable, is adhesively bonded to an area 4 of the wing 1, an aerodynamically functional film 14.2/3 being provided directly on the positioning film 11/15 in portions ultimately forming application areas 13.3. The aerodynamically functional film 14.2/3 is connected detachably to the positioning film 11/15 by way of the adhesive layer 11'/15' otherwise provided for fastening to the wing 1 and for its part has an adhesive layer 18, by way of which the film 14.2/3 can be connected non-detachably to the wing 1.

The multilayer arrangement of positioning film 11/15 and aerodynamically functional film 14.2/3 is attached in a known manner, for example—as illustrated in FIG. 4*a*— by gradually pulling off the non-adhesive carrier 19 and pressing the arrangement onto the wing 1.

If the positioning film 11/15 is fully attached, it can then be removed again. Owing to the redetachable adhesive layer 11'/15', the positioning film 11/15 can be removed without residue, the aerodynamically functional films 14.2/3 remaining on the wing 1 on account of the non-redetachable adhesive layer 18.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A kit for attaching an aerodynamically functional film to a surface of a body around which flow passes, the kit comprising:
   an apparatus for attaching the aerodynamically functional film to the surface of the body, the apparatus comprising a self-adhesive, detachable positioning film having positioning aids for the exact positioning of the positioning film on the surface of the body, and having at least one application area for the aerodynamically functional film that is to be applied; and
   the aerodynamically functional film, which is self-adhesive and configured to adhere to the surface of the body while the positioning film is attached, and is configured to remain on the surface of the body when the positioning film is subsequently removed, the aerodynamically functional film being provided in the at least one application area.

2. The kit as claimed in claim 1,
   wherein the aerodynamically functional film is configured to be arranged on a portion of the surface of the body enclosed within the positioning film in such a way that after attachment of the aerodynamically functional film and subsequent removal of the positioning film, a desired alignment of the aerodynamically functional film is achieved.

3. The kit as claimed in claim 1,
   wherein the aerodynamically functional film has openings or slots in the form of cutouts for locations to be kept free on the surface of the body around which flow passes.

4. The kit as claimed in claim 1, wherein the aerodynamically functional film is a riblet film and the body around which flow passes is a body of an aircraft or an aircraft wing.

5. The apparatus kit as claimed in claim 1, wherein the aerodynamically functional film is configured to be arranged, in an installed state, entirely within the positioning film in such a way that the positioning film protrudes beyond the aerodynamically functional film, and the protruding portions of the positioning film comprises the positioning aids.

6. An apparatus for attaching an aerodynamically functional film to a surface of a body around which flow passes, the apparatus comprising:
- a self-adhesive, detachable positioning film having positioning aids for the exact positioning of the positioning film on the surface of the body and having at least one application area,
- wherein an application window, within which the aerodynamically functional film is configured to be applied to the surface of the body after attachment of the positioning film, is provided in the at least one application area.

7. The apparatus as claimed in claim 6,
wherein the positioning film has, in a region of the application window, alignment aids configured to align the aerodynamically functional film to be applied.

8. The apparatus as claimed in claim 6,
wherein an outline of the application window is matched to a shape of the aerodynamically functional film to be attached within the application window.

9. A kit for attaching an aerodynamically functional film to a surface of a body around which flow passes, the kit comprising the apparatus as claimed in claim 8 and the aerodynamically functional film matched to the outline of the application window.

10. The apparatus as claimed in claim 8, wherein the outline of the application window is not symmetrical.

11. A method for attaching an aerodynamically functional film to a surface of a body around which flow passes, the method comprising:
a) applying a self-adhesive, detachable positioning film to the surface of the body, the positioning film having positioning aids predefining a positioning of the positioning film on the surface of the body and having an application area, the applying of the positioning film being in the position predefined by the positioning aids;
b) applying the aerodynamically functional film to the surface of the body around which flow passes in the application area of the positioning film; and
c) removing the positioning film.

12. The method as claimed in claim 11,
wherein the aerodynamically functional film is provided in the application area of the positioning film, and
wherein steps a) and b) are carried out at the same time.

13. The method as claimed in claim 11,
wherein the aerodynamically functional film is a riblet film and/or the body around which flow passes is an aircraft or an aircraft wing.

* * * * *

UNITED STATES PATENT AND TRADEMARK OFFICE
CERTIFICATE OF CORRECTION

PATENT NO. : 12,263,939 B2
APPLICATION NO. : 17/779583
DATED : April 1, 2025
INVENTOR(S) : Oliver Oeser et al.

Page 1 of 1

It is certified that error appears in the above-identified patent and that said Letters Patent is hereby corrected as shown below:

In the Claims

Column 9, Claim 5, Line 5:
"portions of the positioning film comprises the positioning"
Should read:
--portions of the positioning film comprise the positioning--

Signed and Sealed this
Twenty-second Day of July, 2025

Coke Morgan Stewart
*Acting Director of the United States Patent and Trademark Office*